United States Patent
Holland et al.

[15] 3,686,288
[45] Aug. 22, 1972

[54] PERFLUOROCYCLOHEXANE CARBOXAMIDES

[72] Inventors: Dewey G. Holland, Allentown, Pa.; John H. Polevy, Attleboro, Mass.

[73] Assignee: Air Products and Chemicals, Inc., Allentown, Pa.

[22] Filed: Nov. 7, 1969

[21] Appl. No.: 874,978

[52] U.S. Cl. ...260/501.15, 260/501.17, 260/501.19, 260/557 R, 260/29.1 R, 252/392, 252/547
[51] Int. Cl. .............................................. C07c 103/86
[58] Field of Search ............. 260/557, 501.15, 501.17, 501.19

[56] References Cited

UNITED STATES PATENTS

| | | | |
|---|---|---|---|
| 3,374,244 | 3/1968 | Krimmel | 260/557 |
| 2,670,372 | 2/1954 | Cusic | 260/557 |
| 2,593,737 | 4/1952 | Diesslin et al. | 260/557 |
| 2,459,088 | 1/1949 | Moss et al. | 260/557 |

*Primary Examiner*—Henry R. Jiles
*Assistant Examiner*—Harry I. Moatz
*Attorney*—David T. Nikaido and B. M. Klevit

[57] ABSTRACT

Compounds having the general structure:

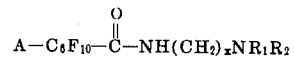

$$A-C_6F_{10}-\overset{O}{\overset{\|}{C}}-NH(CH_2)_xNR_1R_2$$

and salts thereof
wherein
  $-C_6F_{10}-$ is a perfluorocyclohexane moiety,
  A is fluorine or a perfluoroalkyl group having from one to 10 carbon atoms,
  $x$ is an integer from 2 to 3, and
  $R_1$ and $R_2$ are the same or independently selected from alkyl or aryl groups, the alkyl groups having from one to six carbon atoms.

12 Claims, No Drawings

PERFLUOROCYCLOHEXANE CARBOXAMIDES

BACKGROUND OF THE INVENTION

The present invention relates to perfluorocyclohexane carboxamides and salts thereof and, more particularly, it relates to perfluorocyclohexane carboxamides and quaternary ammonium-type salts thereof. It is known in the art that various types of fluorochemical compounds and their salts may be prepared to produce compounds having a variety of uses such as in water and oil repellants, soil repellants, surfactants and the like. However, such compounds have not been entirely satisfactory in providing the most desirable physical properties for the suggested or proposed utility. The compounds of the present invention are believed to provide highly desirable physical properties, such as improved surface tension values.

SUMMARY OF THE INVENTION

In accordance with the present invention, compounds are prepared having the general structure:

(I)

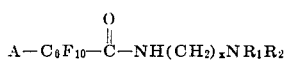

wherein

—$C_6F_{10}$— is a perfluorocyclohexane moiety,

A is fluorine or a perfluoroalkyl group having from one to 10 carbon atoms, $x$ is an integer from 2 to 3, and $R_1$ and $R_2$ are the same or independently selected from alkyl or aryl groups having from one to six carbon atoms.

Salts of the above Structure (I) are also prepared having the general structure:

(II)

wherein

A, $R_1$, $R_2$ and $x$ have the definition stated above, $R_3$ is hydrogen, an alkyl or aryl group having from one to six carbon atoms, and $M^-$ is a halide, sulfate, carboxylate or sulfonate.

Compounds of Structure (I) may be prepared by reacting a perfluorinated cyclic acid fluoride with an N,N-disubstituted alkylene diamine.

Structure (II) compounds may be prepared by reacting Structure (I) compounds with a salt forming agent, e.g., inorganic acids such as halogen acids or sulfur containing acids; organic acids such as organic carboxylic or sulfonic acids or alkyl halides and the like.

PREFERRED EMBODIMENTS OF THE INVENTION

Compounds of the present invention are generally prepared by reacting certain perfluorinated cyclic acid fluoride compositions with an N,N-disubstituted alkylene diamine under controlled conditions. The perfluorinated cyclic acid fluoride compositions that may be employed in preparing compounds of the invention may be represented by the structure:

$$A-C_6F_{10}-COF \quad (III)$$

wherein A is fluorine or a perfluoroalkyl group having from one to 10 carbon atoms and —$C_6F_{10}$— is a perfluorocyclohexane moiety.

Structure (III) compositions may be reacted with appropriate diamine compositions which may generally fall within the scope of N,N-disubstituted alkylene diamines. Such diamines include, for example, N,N-dimethyl ethylene diamine, N,N-dimethyl-1,3-propylene diamine, N,N-diethyl-1,3-propylene diamine, N-ethyl,N-methyl-1,6-hexane diamine and the like. Because of the highly exothermic nature of the reaction, the acid fluoride is slowly and cautiously added to the diamine composition in an inert solvent such as diethyl ether, tetrahydrofuran, dioxane and the like. The reaction may be further controlled by, first, cooling the diamine-containing solvent to room temperature or slightly below and maintaining such temperatures during addition of the acid fluoride. The compounds thus produced may be generically described as perfluorocyclohexane amino-amides.

The above-described amino-amide compositions may be reacted with various acid and acid-type reagents to obtain the quaternary ammonium derivatives of Structure (II). For example, the reagents include inorganic acids such as halogen acids, e.g., hydrogen chloride, hydrogen bromide, hydrogen iodide, etc.; sulfur containing inorganic acids e.g., sulfuric acid; organic acids such as carboxylic acids, e.g., acetic acid, trifluoroacetic acid, butyric acid; organic sulfonic acids e.g., benzene sulfonic acid, toluene sulfonic acid, naphthalene sulfonic acid; alkyl halides such as ethyl bromide, ethyl iodide, methyl chloride, and the like.

The quaternary ammonium derivatives of the invention are stable in aqueous solutions and water soluble in quantities sufficient to have utility as surface active agents to reduce the surface tension of aqueous systems. Therefore, these compositions have various uses such as surfactants in emulsion polymerization of unsaturated monomers, leveling agents in wax formulations, corrosion inhibitors and the like.

The following examples are illustrative of the invention and are not intended to limit the scope thereof.

EXAMPLE 1

To a flask containing 1,224 gms of N,N-dimethyl-3-amino-propyl amine and 3,000 mls of diethyl ether was added, with stirring, 1,958 gms of undecafluoro-cyclohexane carboxylic acid fluoride, while maintaining the temperature of the reaction mixture below 20° C by means of an ice bath. After the addition was completed, the mixture was removed from the ice bath and allowed to warm to room temperature and subsequently stirred for about 16 hours. The reaction mixture was washed three times with 3,000 ml portions of water, dried over magnesium sulfate and the solid residue separated by filtration. The diethyl ether was removed under vacuum and the resulting product distilled at 84° to 97° C at 0.2 mm Hg vacuum, to yield 1,325 gms (72 percent yield) of a product identified to be N,N-dimethyl-3-aminopropyl undecafluorocyclohexane carboxamide.

| $C_{12}H_{13}F_{11}N_2O$ | | C | H | N |
|---|---|---|---|---|
| | Theoretical, % | 35.12 | 3.17 | 6.83 |
| | Found, % | 34.67 | 3.02 | 6.72 |

EXAMPLE 2 THROUGH 5

The compounds in Table I correspond to the compounds of Structure (I) and were prepared as follows:

To 2.0 mole of an amine reagent in 500 mls of diethyl ether was added, with stirring, 1.0 moles of aryl fluoride while maintaining the reaction mixture below 20° C by means of an ice bath. After addition was completed, the reaction mixture was removed from the ice bath and allowed to warm to room temperature and was subsequently stirred for 16 hours. The mixture was washed three times with 500 ml portions of water to remove the excess amine. The resulting solution was dried over magnesium sulfate and filtered. The ether was removed under vacuum and the product was distilled under vacuum, except for the compound of Example 5, which was a solid.

TABLE I

| Ex. | Aryl Fluoride | Amine Reagent | A | $x$ | $R_1$ | $R_2$ | Physical Properties |
|---|---|---|---|---|---|---|---|
| 2 | perfluoro-cyclohexane carboxylic acid fluoride | N,N-dimethyl-3-aminopropyl amine | F | 3 | $CH_3$ | $CH_3$ | b.p. 18–97°C 0.2 mm Hg |
| 3 | perfluoro-4-methyl-cyclohexane carboxylic acid fluoride | N,N-dimethyl-3-aminopropyl amine | $CF_3$ | 3 | $CH_3$ | $CH_3$ | b.p. 85–105°C 0.2 mm Hg |
| 4 | perfluoro-4-(n-butyl) cyclohexane carboxylic acid fluoride | N,N-dimethyl-3-aminopropyl amine | $C_4F_9$ | 3 | $CH_3$ | $CH_3$ | b.p. 84–115°C 0.2 mm Hg |
| 5 | perfluoro-cyclohexane carboxylic acid fluoride | N-ethyl, N-phenyl aminoethyl amine | F | 2 | $C_2H_5$ | $C_6H_5$ | m.p. 151—156°C |

EXAMPLE 6

Three hundred grams of N,N-dimethyl-3-aminopropyl-undecafluorocyclohexane carboxamide were dissolved in 1,000 mls of diethyl ether. Anhydrous hydrogen chloride was bubbled through the solution until the exothermic reaction was completed. The resulting white precipitate was separated by filtering and dried in a vacuum oven at 40° C. The procedure produced 325 gms of the final product (99 percent yield) and was identified to be N,N-dimethyl-3-aminopropyl undecafluorocyclohexane carboxamide hydrochloride, having a melting point of 160°–166° C.

| | | C | H | N |
|---|---|---|---|---|
| $C_{12}H_{14}ClF_{11}N_2O$ | Theoretical, % | 32.25 | 3.14 | 6.27 |
| | Found, % | 32.05 | 3.05 | 5.96 |

EXAMPLE 7

To 300 gms of N,N-dimethyl-3-aminopropylperfluorocyclohexane carboxamide dissolved in 1,000 ml of diethyl ether was added 142 gms of methyl iodide. The mixture was stirred for about 16 hours at room temperature during which time a pale yellow precipitate was formed. The precipitate was separated by filtering and dried under vacuum at 40° C to provide 350 gms of the final product (93 percent yield). The product was identified to be undecafluorocyclohexane carboxamidopropyltrimethylammonium iodide having a melting point of 172°–177° C.

| | | C | H | N |
|---|---|---|---|---|
| $C_{13}H_{16}F_{11}IN_2O$ | Theoretical, % | 28.26 | 2.90 | 5.07 |
| | Found, % | 27.96 | 2.78 | 5.01 |

EXAMPLES 8 THROUGH 13

The compounds of Table II were prepared in accordance with the procedures described in Examples 6 and 7 and correspond to the Structure II. The aqueous surface tension (dynes/cm) of 0.1 and 1.0 weight percent solutions in water, containing the specified quaternary ammonium salts, was measured at 20° C using a Rosano Surface Tensiometer. The results are substantially less than the surface tension for water alone (72.0 dynes/cm).

TABLE II

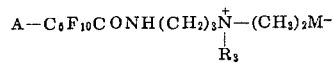

| Ex. | A | $R_3$ | $M^-$ | Surface Tension (dynes/cm at 20°C) Weight % Concentration in Water | |
|---|---|---|---|---|---|
| | | | | .1 | 1.0 |
| 8 | F | H | Cl | 37.5 | 22.8 |
| 9 | F | $CH_3$ | I | 46.0 | 23.7 |
| 10 | $CF_3$ | H | Cl | 32.7 | 22.9 |
| 11 | $CF_3$ | $CH_3$ | I | 32.54 | 22.62 |
| 12 | $C_4F_9$ | H | Cl | 31.4 | 21.9 |
| 13 | $C_4F_9$ | $CH_3$ | I | 32.0 | 21.6 |

Two separate solutions each containing 0.2 percent by weight of the compounds of Example 8 and Example 12 respectively were prepared in a hydrochloric acid solution having a pH of 2. Weighed steel coupons, having dimensions of 1 inch × 1 inch × 0.005 inch and which had been degreased with acetone, were placed into each solution. A similar coupon was placed into a control hydrochloric acid solution of pH 2 containing no compounds of the invention. The coupons remained in the solution for 10 days at room temperature. The coupons were removed from the solutions, rinsed with distilled water, dried and re-weighed. The coupon immersed in the solution containing the compound of Example 8 showed 17 times less weight loss than the control coupon. The coupon immersed in the solution containing the compound of Example 12 showed 11 times less weight loss than the control coupon. From the above, it is seen that the compounds of the invention show highly desirable properties as corrosion inhibitors.

In place of the particular amine reagents and acid reagents employed in the examples, other amine and acid reagents, as hereinbefore set forth, may be substituted to provide compounds of the invention having substantially the same properties.

What is claimed is:

1. A compound having the structure:

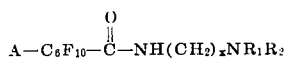

wherein

—$C_6F_{10}$— is a perfluorocyclohexane moiety

A is fluorine or a perfluoroalkyl group having from one to 10 carbon atoms, A being in the 4-position, x is an integer from 2 to 3, and $R_1$ and $R_2$ are the same or independently selected from an alkyl or phenyl group, the alkyl group having from one to six carbon atoms.

2. A salt derivative of compounds as defined in claim 1 having the structure:

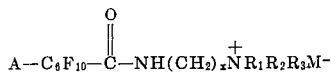

wherein

—$C_6F_{10}$ is a perfluorocyclohexane moiety,

A is fluorine or a perfluoroalkyl group having from one to 10 carbon atoms, A being in the 4-position x is an integer from 2 to 3, $R_1$ and $R_2$ are the same or independently selected from alkyl groups having from one to six carbon atoms or phenyl groups, $R_3$ is hydrogen, alkyl groups having from one to six carbon atoms or phenyl groups, and $M^-$ is a halide, sulfate, acetate or butyrate radical.

3. The compound according to claim 1, wherein A is fluorine, $X$ is 3, $R_1$ is $CH_3$ and $R_2$ is $CH_3$.

4. The compound according to claim 1, wherein A is $CF_3$, x is 3, $R_1$ is $CH_3$ and $R_2$ is $CH_3$.

5. The compound according to claim 1, wherein A is $C_4F_9$, x is 3, $R_1$ is $CH_3$ and $R_2$ is $CH_3$.

6. The compound according to claim 1, wherein A is fluorine, x is 2, $R_1$ is $C_2H_5$ and $R_2$ is $C_6H_5$.

7. The compound according to claim 2, wherein A is fluorine, x is 3, $R_1$ is $CH_3$, $R_2$ is $CH_3$, $R_3$ is hydrogen and $M^-$ is Cl.

8. The compound according to claim 2, wherein A is fluorine, x is 3, $R_1$ is $CH_3$, $R_2$ is $CH_3$, $R_3$ is $CH_3$ and $M^-$ is I.

9. The compound according to claim 2, wherein A is $CF_3$, x is 3, $R_1$ is $CH_3$, $R_2$ is $CH_3$ $R_3$ is hydrogen and $M^-$ is Cl.

10. The compound according to claim 2, wherein A is $CF_3$, x is 3, $R_1$ is $CH_3$, $R_2$ is $CH_3$, $R_3$ is $CH_3$ and $M^-$ is I.

11. The compound according to claim 2, wherein A is $C_4F_9$, x is 3, $R_1$ is $CH_3$, $R_2$ is $CH_3$, $R_3$ is hydrogen and $M^-$ is Cl.

12. The compound according to claim 2, wherein A is $C_4F_9$, x is 3, $R_1$ is $CH_3$, $R_2$ is $CH_3$, $R_3$ is $CH_3$ and $M^-$ is I.

* * * * *